UNITED STATES PATENT OFFICE.

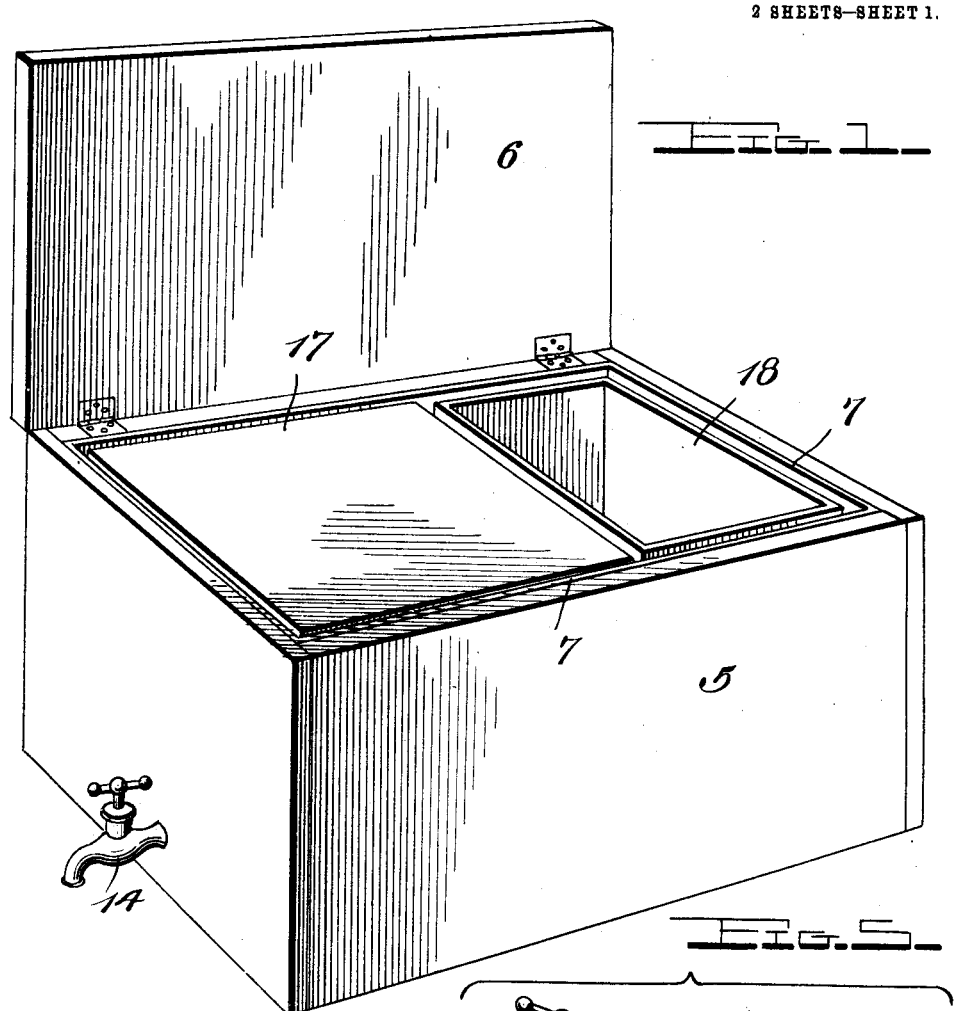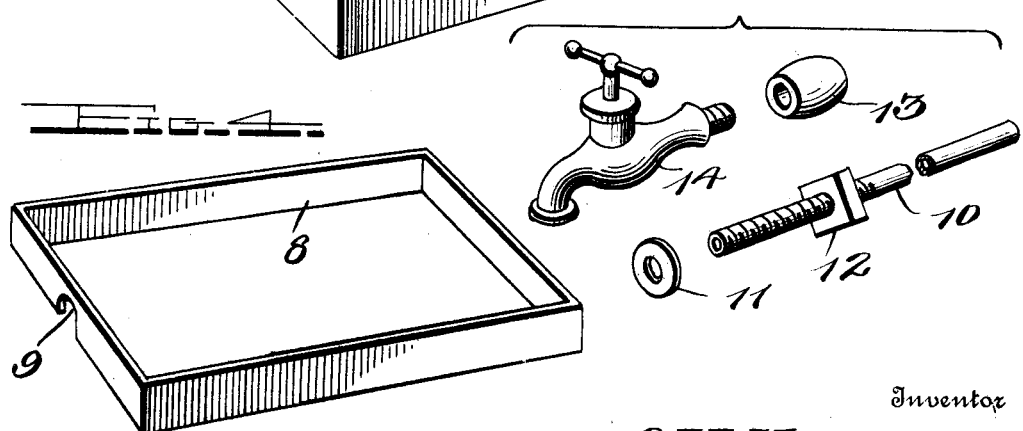

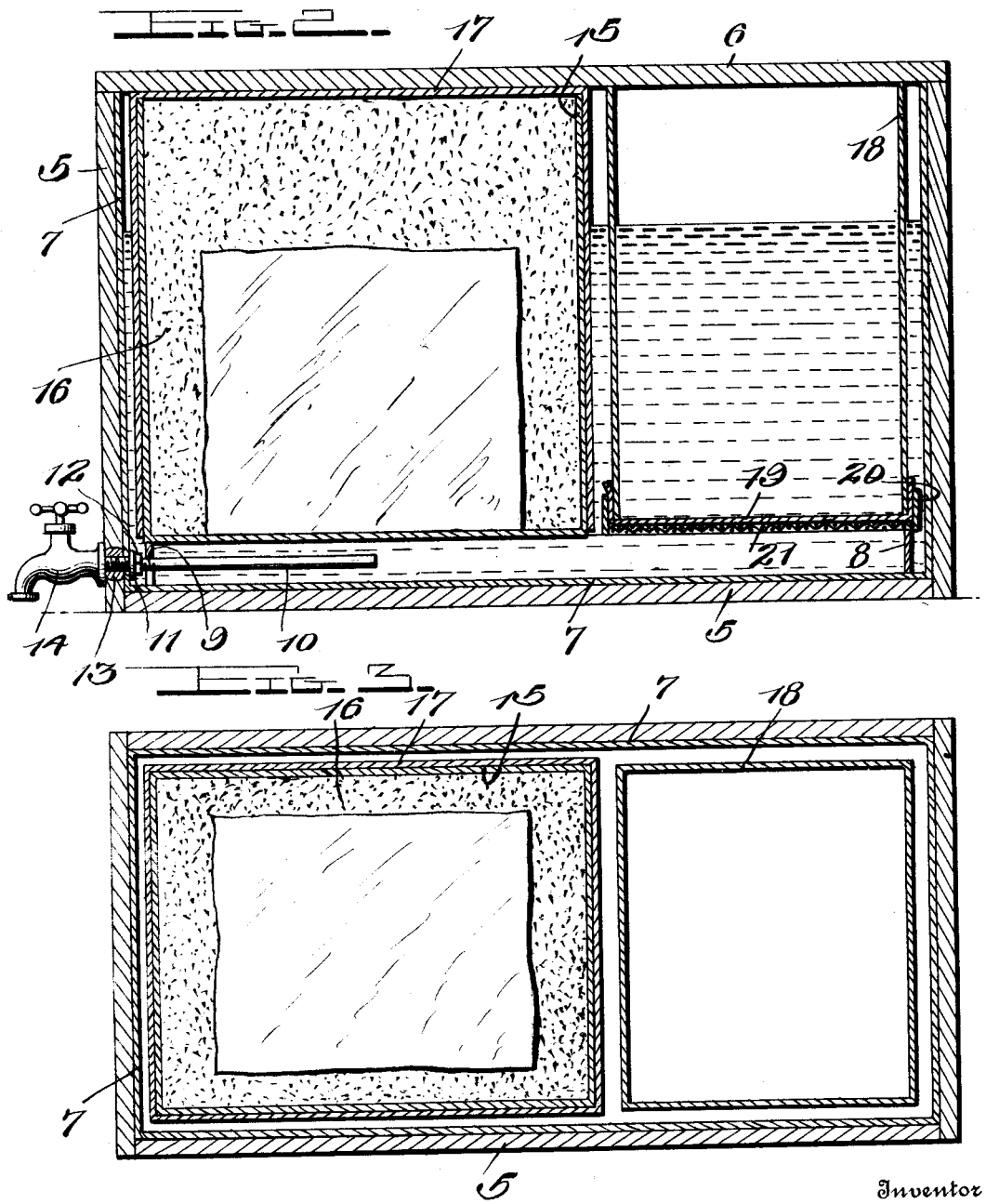

OSCAR V. HANNA, OF MERIDIAN, TEXAS.

LIQUID-COOLER.

1,067,918.

Specification of Letters Patent.

Patented July 22, 1913.

Application filed October 2, 1912. Serial No. 723,610.

*To all whom it may concern:*

Be it known that I, OSCAR V. HANNA, a citizen of the United States, residing at Meridian, in the county of Bosque and State of Texas, have invented certain new and useful Improvements in Liquid-Coolers, of which the following is a specification, reference being had to the accompanying drawings.
This invention relates to improvements in liquid coolers and has for its object to produce a device of this character which consists of few parts of simple form which may be manufactured at small cost, and which may be readily disassembled so that they can be thoroughly cleaned and the device thus maintained in a sanitary condition.

With the above and other objects in view as will become apparent as the description proceeds, the invention consists in certain constructions, combinations and arrangements of the parts that I shall hereinafter fully describe and claim.

For a full understanding of the invention, reference is to be had to the following description and accompanying drawing, in which—

Figure 1 is a perspective view of a liquid cooler embodying the present invention, the lid of the outer case or chest being raised. Fig. 2 is a vertical longitudinal section; Fig. 3 is a horizontal section; Fig. 4 is a perspective view of the supporting frame for the ice box and filter; and Fig. 5 is a perspective view of the water faucet and attaching parts.

Referring in detail to the drawings 5 designates the outer box or chest which is provided with a hinged lid 6. The box or chest 5 is preferably constructed of wood and within the same a metal lining 7 is adapted to be arranged. In the bottom of this metal box the rectangular metal frame 8 is disposed, and is slightly spaced from the walls of the lining 7. One of the end walls of the chest 5 is provided with an opening to register with an opening in the opposed wall of the insertible lining 7. One end of the frame 8 is also provided with a notch or recess 9 which coincides with the openings in the chest 5 and the metal lining 7. Through these alined openings and the notch 9 of the frame 8, a pipe 10 is disposed, said pipe extending inwardly between the parallel side walls of the frame 8. The opening in the end wall of the chest is tapered toward its opposite ends, and the sleeve 13 is also tapered toward its opposite ends and is of a length equal to the thickness of the wall of the chest. The outer end of this pipe is provided with external screw threads upon which a washer 11 and nut 12 are arranged, said nut being adapted for adjustment upon the pipe to clamp the washer 11 against the inner face of the end wall of the metal lining 7. When the nut 12 is adjusted upon the pipe to clamp the washer 11 against the inner face of the end wall of the lining 7, the outer face of the lining is forced against the inner end of the sleeve 13 whereby a tight joint is provided to prevent leaking of the water from the chest. Upon the threaded outer end of the pipe 10 a sleeve 13 is engaged, said sleeve extending through the opening in the end wall of the chest 5. The bore of this sleeve is threaded to receive a threaded nipple provided upon the spigot or faucet 14.

Within one end of the metal lining 7 the metallic ice container 15 is adapted to be arranged, the walls thereof being slightly spaced from the walls of the lining 7. After the ice has been placed in the container, it is closely packed and entirely covered with sawdust indicated at 16, to absorb the water from the melting ice, said sawdust packing also acting as a non-heat conducting medium, thus preventing the ice from melting too rapidly. This ice container 15 is adapted to be closed by means of a rectangular cover 17 which is inserted over the open top thereof.

A water filter is adapted to be arranged in the metal lining 7 and includes a casing 18 open at both ends. Over one end of this casing a suitable straining cloth indicated at 19 is arranged, and a shallow rectangular pan 20 is adapted to be engaged upon the edges of this strainer cloth and with the walls of the casing 18 to retain said cloth in position. The bottom of this pan is constructed of wire mesh or other reticulated material shown at 21. It will be understood that the ice container and the filter rest upon the rectangular metal frame 8 so that they are spaced from the bottom wall of the lining 7.

In the use of the device, the container 15 is filled with ice and saw dust and placed within the metal lining 7 upon the frame 8.

The filter having been properly assembled is then arranged within the unoccupied portion of the lining 7 and the water or other liquid poured into the filter. The liquid passing through the straining cloth and the wire mesh 21 of the filter will be purified, and will occupy the space between the walls of the lining 7 and the walls of the ice container and filter. This surrounding body of water will exclude heat from the interior of the lining 7. When the water has become sufficiently cool, it may be drawn off through the faucet 14 for drinking purposes.

From the foregoing it is thought that the construction and manner of use of my improved liquid cooler will be clearly understood.

The device will be found of great convenience and serviceability in hospitals, sanitariums and similar institutions.

As the invention consists of but few parts of simple form it may be manufactured at comparatively small cost, so that the same may be retailed to individuals for home use.

While I have shown and described the preferred form and construction of the several elements employed, it will be understood that the invention is susceptible of considerable modification without departing from the essential features or sacrificing any of the advantages thereof.

Having thus described the invention, what is claimed is:

In a device of the character described, the combination with a chest, said chest having an opening formed in one wall thereof, said opening being tapered toward its opposite ends, a lining for the chest, said lining having an opening formed therein less in diameter than the opening of the chest, said openings being in registration, a sleeve disposed within the opening of the chest, said sleeve being tapered toward its opposite ends and being of a length equal to the thickness of the wall of the chest, said sleeve having a threaded opening formed therein, a pipe threaded within said sleeve, said pipe extending through the lining and into the chest, a washer located upon the pipe and engaging the lining of the chest, a nut threaded upon the pipe for forcing the washer into engagement with one side of the lining, and the sleeve into engagement with the opposite side of the lining, a spigot, and a nipple formed upon the spigot and threaded into the outer end of the sleeve.

In testimony whereof I hereunto affix my signature in the presence of two witnesses.

OSCAR V. HANNA.

Witnesses:
J. T. WORD,
T. C. HILL.

---

Copies of this patent may be obtained for five cents each, by addressing the "Commissioner of Patents, Washington, D. C."